United States Patent [19]

Siegell et al.

[11] Patent Number: 4,543,733
[45] Date of Patent: Oct. 1, 1985

[54] FLUIDITY OF A CONTINUOUS TRANSVERSE FLOW MAGNETICALLY STABILIZED FLUIDIZED BED

[75] Inventors: Jeffrey H. Siegell, Westfield; Costas A. Coulaloglou, Morristown, both of N.J.

[73] Assignee: Exxon Research and Engineering Co., Florham Park, N.J.

[21] Appl. No.: 345,094

[22] Filed: Feb. 2, 1982

[51] Int. Cl.[4] .................. F28D 13/00; F26B 17/10; C10B 47/24

[52] U.S. Cl. ........................................ 34/1; 201/31; 34/10; 209/46; 209/467; 427/185; 423/DIG. 16; 210/656; 422/147; 422/143; 422/145; 165/104.16

[58] Field of Search ............... 209/454, 466, 467, 474, 209/478, 212, 232, 1, 39, 40; 34/1, 10; 165/104.16; 201/31; 422/139, 147, 143–145; 423/DIG. 16; 425/DIG. 20; 427/185, 213; 210/656

[56] References Cited

U.S. PATENT DOCUMENTS

| | | | |
|---|---|---|---|
| 1,291,137 | 1/1919 | Reed | 209/474 |
| 3,471,016 | 10/1969 | Eveson et al. | 209/474 X |
| 4,115,927 | 9/1978 | Rosenweig | 422/139 |
| 4,132,005 | 1/1979 | Coulaloglou | 34/1 X |
| 4,136,016 | 1/1979 | Rosensweig | 422/139 |
| 4,194,971 | 3/1980 | Beeckmans | 209/467 |
| 4,247,987 | 2/1981 | Coulaloglou et al. | 55/79 X |
| 4,254,557 | 3/1981 | Mayer | 34/1 |
| 4,255,403 | 3/1981 | Mayer | 34/1 |
| 4,261,109 | 4/1981 | Mikus et al. | 34/1 |
| 4,283,204 | 8/1981 | Savase | 34/1 |
| 4,367,153 | 1/1983 | Seiver | 34/1 |
| 4,368,131 | 1/1983 | Rosenweig | 34/1 |
| 4,368,132 | 1/1983 | Seiver | 34/1 |

FOREIGN PATENT DOCUMENTS

55-5376 6/1980 Japan.

OTHER PUBLICATIONS

Kamiyama et al., *Bull. JSME*, vol. 22, No. 171, pp. 1205–1211, Sep. 1979, (abstract only).
Von W. Isler, *Zement-Kalk-Gips*, No. 10/1960, pp. 482–486.
*Modern Materials Handling*, vol. 22, Iss. 9, pp. 42–44, (1967).
*Fordern and Heben*, vol. 18, No. 1, pp. 56–57, (1968).
Shinohara et al., *J. of Chem. Engineering of Japan*, vol. 5, No. 3, pp. 279–284, (1972).
Shinohara et al., *J. of Chem. Engineering of Japan*, vol. 6, No. 5, pp. 447–452, (1973).
D. Martin, *Process Engineering*, p. 39, (Jul. 1975).
W. Stegmaier, *Fordern and Heben*, vol. 26, No. 6, pp. 621–624, (1976).
C. Woodcock, et al., *Intern. Powder and Bulk Solids and Processing*, Proceeding of Technical Progress, Philadelphia, Penna., May 15–17, 1979, pp. 35–45.

*Primary Examiner*—Frank W. Lutter
*Assistant Examiner*—William Bond
*Attorney, Agent, or Firm*—John W. Ditsler; E. Thomas Wheelock

[57] ABSTRACT

In a magnetically stabilized fluidized bed in which the bed particles continuously move transverse to the flow of the fluidizing fluid, the bed particles have increased fluidity when the bed is operated at or substantially near the locus of transition between the bubbling and stabilized regimes of said bed. More specifically, the particulate bed comprising a transverse flow magnetically stabilized fluidized bed process has greater fluidity when the bed is operated such that the ratio of the difference between the transition velocity and the operating velocity to the difference between the transition velocity and the normal minimum fluidization velocity ranges between −0.1 and +0.5. The increased fluidity facilitates the movement of solids within a vessel as well as the transfer of solids to other vessels. Stabilization of the bed, which prevents and substantially eliminates fluid bypassing and solids backmixing, may be effected externally by an applied magnetic field or internally by permanently magnetized magnetic particles within the bed. The present invention has application to a wide variety of processes (particularly separation and filtration-processes) wherein small size fluidizable, absorbent particles can be used without encountering the high pressure drops normally associated with non-stabilized beds.

21 Claims, 8 Drawing Figures

$\alpha$ = BED TILT ANGLE
$\gamma$ = ANGLE OF SOLIDS FLOW

FLUIDITY OF A CONTINUOUS TRANSVERSE FLOW MAGNETICALLY STABILIZED FLUIDIZED BED

FIELD OF THE INVENTION

The present invention relates to a process for the continuous transverse flow of fluidized solids in magnetically stabilized fluidized beds. More particularly, the invention relates to improving the fluidity of the particulate bed during a continuous transverse flow magnetically stabilized fluidized bed process by operating said bed at or substantially near the locus of transition between the bubbling and stabilized regimes.

BACKGROUND OF THE INVENTION

Numerous investigators have studied the influence of magnetization on the dynamics of fluidized solids in batch bed operations. An early account of this phenomenon was reported by M. V. Filippov [Applied Magnetohydrodynamics, *Trudy Instituta Fizika Akad. Nauk.*, Latviiskoi SSR 12:215–236 (1960): *Zhurnal Tekhnicheskoi Fiziki*, 30, (9): 2081–1084 (1960); *Izvestiya Akad. Nauk.*, Lativvskoi SSR, 12 (173): 47–51 (1961); *Izvestiya Akad. Nauk.*, Latviiskoi SSR, 12: 52–54 (1961); and Aspects of Magnetohydrodynamics and Plasma Dynamics, Riga (1962), *Izvestiya Akad. Nauk.*, Latviiskoi SSR, pp. 637–645]. Subsequent investigators have described the influence that magnetization exerts on pulsations, heat transfer, structure, and other characteristics of magnetized and fluidized solids in batch bed operations. A partial review of such studies has been presented by Bologa and Syutkin [*Electron Obrab Mater*, 1: 37–42 (1977)]. Ivanov and co-workers have described some benefits of applying a magnetic field to fluidized ferromagnetic solids during ammonia synthesis and noted some of the bed characteristics during said synthesis [see British Pat. No. 1,148,513 and numerous publications by the same authors, e.g., Ivanov et al, *Kinet. Kavel*, 11 (5): 1214–1219 (1970); Ivanov et al, *Zhurnal Prikladnoi Khimii*, 43, 2200–2204 (1970); Ivanov et al, *Zhurnal Prikladnoi Khimmi*, 45: 248–252 (1972); Ivanov et al, *Chemical Industry*, 11, 856–585 (1974); Shumkov et al, *Zhurnal Prikladnoi Khimii*, 49 (11): 2406–2409 (176)]. In addition, various means for operating magnetic fields to stabilize a bed of magnetizable solids have been disclosed in U.S. Pat. Nos. 3,440,731; 3,439,899; 4,132,005 and 4,143,469; and Belgium Pat. No. 865,860.

Recently, R. E. Rosensweig reported a number of features relating to magnetically stabilized fluidized magnetizable solids and provided a systematic interpretation of the phenomenon [*Science*, 204: 57–60 (1979), *Ind. Eng. Chem. Fundam.*, 18, (3): 260–269 (1979), Lucchesi et al, *Proc. of the 10th World Petroleum Congress*, Bucharest, Romania, 1979, 4, Heyden and Sons, Philadelphia, Pa. (1979) and U.S. Pat. Nos. 4,115,927 and 4,136,016]. These publications noted the quiescent, fluid-like state of the magnetically stabilized fluidized bed (MSB), particularly a bed totally free of bubbles or pulsations when subjected to a uniform magnetic field applied colinear with the flow of the fluidizing fluid. Bed stabilization results in a non-bubbling fluid state having a wide range of operating velocities (denoted as superficial fluid velocities) which range between (a) a lower limit defined by the normal minimum fluidization superficial fluid velocity ($U_{mf}$) required to fluidize the bed in the absence of the applied magnetic field, i.e. magnetic effects, and (b) an upper limited defined by the superficial fluid velocity ($U_T$) required to cause time-varying fluctuations of pressure difference through the stabilized bed during continuous fluidization in the presence of the applied magnetic field. In U.S. Pat. No. 4,115,927, Rosensweig discloses that the stably fluidized solids resemble a liquid such that solids transport is facilitated while the pressure drop is limited to that of a fluidized bed. Also the backmixing normally associated with conventional fluidized bed processes is absent. Furthermore, while U.S. Pat. No. 4,115,927 suggests the possibility of transporting the solids from the containing vessel (see column 8 lines 58–59 and column 21 lines 17–24), none of the experiments involved continuous throughput of bed solids. In addition, neither Rosensweig nor Filippov described operations near the locus of transition between the bubbling and stabilized regions in beds having continuous solids addition and removal. Therefore, the boundaries of the regions defined by Rosensweig and by Filippov do not concern processes where solids are added and removed continuously.

More recently, U.S. Pat. No. 4,247,987, the Belgian counterpart of which was granted on Mar. 29, 1981 as Belgian Pat. No. 885,390, described the countercurrent operation of a magnetically stabilized bed with continuous solids addition and removal at or substantially near the locus of transition between the bubbling and stabilized regions of the bed in order to increase bed fluidity. However, patentees disclose only countercurrent operations—no mention is made of solids transport transverse to the flow of the fluidizing fluid.

SUMMARY OF THE INVENTION

Accordingly, the present invention is directed to a method of increasing the fluidity of the particulate bed in a continuous transverse flow magnetically stabilized fluidized bed process. More particularly, in a magnetically stabilized bed wherein a bed of fluidized magnetizable particles is contacted with a gaseous or liquid fluidizing fluid passing upward through said bed but transverse (i.e., non-parallel) to the flow of the bed particles, said particulate bed will have greater fluidity when the bed is operated at or substantially near the locus of transition between the bubbling and stabilized regimes. As used herein, the expression "substantially near the locus of transition" refers to maintaining the fluidity ratio (or the difference between the transition velocity and the operating velocity to the difference between the transition velocity and the normal minimum fluidization velocity) between −0.1 and +0.5. The fluidity ratio may be expressed mathematically as:

$$\frac{U_T - U_{op}}{U_T - U_{mf}}$$

where $U_T$ is the superficial fluid velocity required to cause time-varying fluctuations of pressure difference through the bed in the presence of a magnetic stabilizing means, $U_{mf}$ is the normal minimum fluidization superficial fluid velocity required to fluidize the bed of magnetizable particles in the absence of magnetic effects, and $U_{op}$ is the actual operating superficial fluid velocity.

The magnetic stabilizing means, which serves to stabilize the bed, should be of sufficient strength to suppress particle backmixing within the bed but below that which would cause excessive particle to particle attractive forces. Similarly, the superficial velocity of the fluidizing fluid should be in excess of the normal minimum fluidization superficial velocity in the absence of magnetic effects, but below the superficial velocity which will cause solids backmixing.

DETAILED DESCRIPTION OF THE INVENTION

The present invention relates to a method of improving the fluidity of a stabilized fluidized bed of magnetizable particles during the transverse flow contacting of said particles with an upward moving fluidizing fluid by subjecting said bed to a magnetic stabilizing means at a superficial fluid velocity and a particle magnetization such that the fluidity ratio ranges between $-0.1$ and $\pm 0.5$, preferably between $-0.05$ and $+0.2$ and more preferably between $-0.01$ and $+0.1$. The magnetic stabilizing means may be internal using permanently magnetized particles (such as are described in U.S. Pat. No. 4,261,101, the entire disclosure of which is incorporated herein by reference) or external using an applied magnetic field. While the magnetic stabilizing means employed may be either internal or external (with external being preferred), the present invention will be described hereinafter with respect to the use of an externally applied magnetic field, most preferably a uniform applied magnetic field having a substantial component along the direction of the external force field (i.e. gravity).

Depending upon the specific processing objective, the present invention may be operated in the bubbling regime (corresponding to negative valves of fluidity ratio) or in the substantial absence of bubble formation (corresponding to positive values of fluidity ratio). For example, the bed will normally be operated in the bubbling regime when heat transfer is desired. Usually however, it is preferred that the strength of the magnetic stabilizing means be maintained so as to prevent or suppress substantial bubble formation and fluid bypassing in the bed.

Magnetically stabilized fluidized beds have the appearance of expanded fixed beds with essentially no gross solids backmixing and essentially no fluid bypassing such as bubbling in gas fluidized beds and roll-cell behavior in liquid fluidized beds. The application of the magnetic field allows superficial fluid flow rates of 2, 5, 10 or more times the flow rate of the fluidized bed at incipient fluidization in the absence of the magnetic field, along with the substantial absence of gross solids backmixing and fluid bypassing. As the superficial fluid velocity is increased, the pressure drop through the bed is similar to that which would be expected from a normal fluidized bed not subjected to an applied magnetic field—the pressure drop increases to a value corresponding to the ratio of bed weight to cross sectional area at the minimum fluidization velocity, and then remains relatively constant as the fluid velocity is increased. This stably fluidized bed condition persists even as the solids are continuously added to and removed from the contacting vessel.

An important feature of the present invention is that the fluidity of a bed of magnetically stabilized fluidized particles continuously decreases from the fluidity at the bubbling or transition fluidization velocity as the magnetic field is increased above, or the superficial fluid velocity is decreased below, the value at transition. Thus, in the case of moving beds, it is desirable to operate close to the locus of transition between the stable, non-bubbling bed and the bubbling regime in order to take advantage of the increased fluidity. Transverse flowing stabilized beds which are operated close to $U_T$ exhibit a non plug flow solids velocity profile in the vertical direction in the absence of a solids flow controlling weir at the bed exit. As disclosed in copending application Ser. No. 345,046 filed on the same date herewith, transverse flowing stabilized beds which are operated further away from $U_T$ exhibit essentially plug flow; i.e., essentially a flat vertical velocity profile. Deviations from plug flow profile when the beds are operated in the more fluid region may be reduced or substantially eliminated by proper design of a solids flow weir at the bed exit.

The fluidity of the bed can be determined by measuring the angle of repose of the bed particles at given superficial fluid velocities and applied magnetic fields. The data in Tables II, III and IV hereinafter show that by increasing the applied magnetic field or decreasing the superficial gas velocity from the transition point increases the angle of repose. Thus, to obtain increased bed fluidity, the stabilized fluidized bed should be operated at low applied magnetic fields or high fluid velocities (i.e., as close to transition as possible). The induced magnetization of the particles should be insufficient to cause excessive particle to particle attractive forces in the bed.

The magnetically stabilized bed thus described combines in one system the principal advantages of both fluidized bed and fixed bed reactor systems as is summarized in Table I below.

TABLE I

|  | Fluid Bed | MSB | Fixed Bed |
|---|---|---|---|
| Small particle size with low Δ p | yes | yes | no |
| Absence of fluid bypassing | no | yes | yes |
| Continuous solids throughput | yes | yes | no |

TABLE I-continued

|  | Fluid Bed | MSB | Fixed Bed |
|---|---|---|---|
| Avoids solids backmixing | no | yes | yes |
| Avoids entrainment from bed | no | yes | yes |

As an example of the advantage of a magnetically stabilized bed, the use of small particle size reduces diffusional resistance within a bed particle such that the particle (be it catalyst or sorbent) can be used more effectively. At the same time, both high pressure drop and gross fluid bypassing are eliminated. If used as a sorbent, small particles having a magnetic component permit faster transfer of the sorbed species from the contacting fluid than do larger adsorbent particles, thereby enabling a faster approach to equilibrium. Also with magnetically stabilized beds, several steps or operations can be combined in the single reacting system; for example, simultaneous reaction and fluid to particle heat exchange, particulate removal plus chemical reaction, etc. An additional advantage is that the solids can be added to or removed from the bed. Since the stabilized beds are mobile, it is possible to carry out continuous reactions with frequent regenerations so that catalyst or sorbent activity can be restored rapidly in another vessel following a short cycle.

The bed may contain magnetic and non-magnetic materials. For example, non-magnetic particles may be used as admixtures or as composites with a ferromagnetic or ferrimagnetic substance. All ferromagnetic and ferrimagnetic substances, including, but not limited to, magnetic $Fe_3O_4$, $\gamma$-iron oxide ($Fe_2O_3$), ferrites of the form $MO.Fe_2O_3$, wherein M is a metal or mixture of metals such as Zn, Mn, Cu, etc.; ferromagnetic elements including iron, nickel, cobalt and gadolinium, alloys of ferromagnetic elements, etc., may be used as the magnetizable and fluidizable particulate solids which are used in admixture or composited with the non-magnetic particles. Alternatively the nominally non-magnetic material may itself contain a ferromagnetic or ferrimagnetic substance in its chemical or physical makeup. In this case, the nominally non-magnetic material exhibits magnetic properties. Therefore, no additional magnetic material need be admixed or composited with the nominally non-magnetic material.

The magnetizable particles used in the present invention must have the proper magnetizable properties (and in some instances sorption or catalytic properties). Depending upon the application, a variety of magnetizable particles may be utilized. For non-catalytic operations such as filtering and heat transfer, ferromagnetic materials such as 400 series stainless steels, cobalt, iron and nickel as well as natural ferrites can be used. For catalytic or sorption applications the magnetizable materials may be included in suitable catalyst or sorption particle bases such as silica, alumina or silica-aluminas. A method of preparing magnetizable sorption particles is described in U.S. Pat. No. 4,247,987, the entire disclosure of which is incorporated herein by reference.

The weight fraction of magnetizable material when admixed or composited with the non-magnetic material will vary depending upon process conditions, the particular application of the present invention and the like. Typically, however, the fraction of magnetizable magnetizable in the bed will be at least 10 weight percent and, preferably, should range from about 25 to about 75 weight percent.

The bed particles (composites or admixtures) will typically have an average mean particle diameter ranging from about 50 to about 1500 microns. The particles may be of a single size or a mixture of several size ranges. Similarly, the particles may be of any shape, e.g., spherical, irregular shaped or elongated.

For economy, it is desirable that the bed solids achieve sufficient magnetization to stabilize the bed at a relatively small intensity of applied magnetic field. When ferromagnetic particles are placed in the magnetic field, the induced magnetization is a function of the magnetic material, the geometry of the ferromagnetic particle and the geometry of the bed, as is described in U.S. Pat. No. 4,247,987.

Conventional permanent magnets, electromagnets or both can be employed to provide the magnetic field. The electromagnets may be energized by alternating or direct current, although direct current energized magnetic fields are preferred. When powered by direct current with the use of solid state control or a transformer/rectifier, electromagnets are particularly desirable for applying a magnetic field to the bed particles and provide an excellent method of stabilizing the fluidization of the bed particles in response to the flow of the fluidizing fluid.

The invention is not limited by the shape or positioning of the magnet employed to produce the externally applied magnetic field. The magnet can be of any size, strength or shape and can be placed above or below the bed depending upon the solids used, the degree of stabilization required and the like. The magnets can be placed within or outside the vessel and may even be employed as an integral portion of the vessel structure. The process is not limited to any particular vessel or vessel material and it can be readily adapted for use in contacting vessels currently employed by industry. In a preferred embodiment, a solenoidal shaped electromagnetic is employed to surround the fluidized bed as this provides the most uniform magnetic field and consequently the best stability throughout the bed.

With proper selection of magnetic particles, the power requirement for the electromagnet field source in commercial plants will be modest. Magnet power dissipation generates heat that may be removed using natural convection air cooling. This eliminates any need for liquid convection cooling and attendant requirements for coolant treatment and recirculation. The magnetic field source may be computer designed with high confidence to yield an applied magnetic field having a specified intensity and uniformity.

The strength of the magnetic field to be applied to the fluidized solids in the contacting zone will depend on the magnetization of the magnetizable particles and the degree of stabilization desired. Particles having relatively weak magnetic properties, e.g., some composites and alloys, will require the application of a stronger magnetic field than particulate solids having strong magnetic properties, e.g., iron, to achieve similar stabilization effects. The size and shape of the solids will also have an effect on the strength of the magnetic field to be employed. The magnetization of the particles should not be sufficient to cause excessive particle to particle attractive forces and agglomeration which would tend to freeze or lock the particles in the bed and prevent continuous operation. However, since the strength of the field produced by an electromagnet depends on the current strength of the electromagnet, an operator can readily adjust the field strength to achieve the desired degree of stabilization for the particular system employed. Specific methods of applying the magnetic field are also described in U.S. Pat. Nos. 3,440,731; 3,439,899; 4,115,927 and 4,143,469; British Pat. No. 1,148,513 and in the published literature, e.g., M. V. Filippov, Applied Magnetohydrodynamics, *Trudy Instituta Fizika Akad. Nauk.*, Latviiskoi SSR 12:215–236 (1960); Ivanov et al, *Kinet. Kavel,* 11 (5):1214–1219 (1970); Ivanov et al, *Zhuranal Prikladnoi Khimii,* 45:248–252 (1972); and R. E. Rosensweig, *Science,* 204:57–6 (1979), the entire disclosures of which are incorporated herein by reference. The most preferred applied magnetic field will be a uniform magnetic field such as is described in U.S. Pat. No. 4,115,927. Typically, the applied magnetic field for an empty vessel will range from about 5 to about 1500 Oersteds, preferably from about 10 to about 1000 Oersteds.

The present invention can be utilized in a wide variety of processing configurations. For example, after undergoing the continuous transverse flow contacting described previously, the magnetizable particles may be removed from the contacting chamber, although the removal may be intermittent. If desired, the bed particles may be recycled to the contacting chamber or be passed through said chamber in a single pass mode; e.g. an iron ore reduction processor or a solids drying process. As an example of another configuration, the magnetizable particles may be removed continuously (or intermittently) from a first contacting chamber and passed to a second contacting chamber for regeneration prior to being recycled to the first contacting chamber. These examples should be considered as illustrative only and are not to be construed as limiting the scope of the present invention.

Similarly the present invention may be applied readily to a variety of processes, including but not limited to particulate removal of solids, sorption separation processes, and solids-solids separation processes. For example, the present invention is well suited for removing small contaminant particulates from a fluid stream, especially at elevated temperatures and pressures which are beyond the capability of commercial electrostatic precipitators and baghouses. For gas phase beds, the gas bubbles and bypassing which render conventional gas phase fluidized beds ineffective for filtration are absent. For liquid phase fluidized beds, the roll-cell behavior normally present is absent when the bed is stabilized. Compared to a settled bed of small-size solids, the expanded structure of a magnetically stabilized bed can collect a much greater quantity of particulates without tending to plug at the fluid inlet face. The flow properties of the solids facilitate use of a continuous solids-flow system in which the particulate-laden solids flow to another vessel for regeneration and particulates removal.

The operating conditions employed in the present invention will vary broadly depending upon the particular application. In general, however, temperatures will range from ambient, or lower, to the Curie temperature of the magnetic component within the bed, and pressures will range from about 1 to about 10,000 psia. The superficial velocity of the fluidizing fluid will vary depending on the inclination of the distributor, the geometry of the vessel, the particular solids being fluidized and the like. Normally however, the superficial fluid velocity will range from about 0.0001 to about 5 m/sec. liquid phase superficial fluid velocities will range typically from about 0.0001 to about 0.1 m/sec. while gas phase superficial fluid velocities will range from about 0.001 to 5 m/sec. Similarly, the solids transverse flow velocity can vary broadly depending upon the velocity of the fluidizing fluid, the geometry of the vessel, the solids being fluidized, etc. Generally, however, the solids velocity will range from about 0.001 to about 50 cm/sec.

A specific application of the present invention involves removal of particulates from hot gases from a pressurized fluid bed coal combustor prior to contact with expansion turbines for power recovery in a combined cycle system. In such a process coal, limestone and compressed air are fed to a pressurized fluid bed boiler. The hot gases from the boiler (925° C. and 950 kPa) are transported to primary and secondary cyclones to remove ash. The gases are then fed continuously to a transverse flow magnetically stabilized contactor such that 99+% of the incoming particulates are removed. The particulate-laden solids flow to a bubbling bed elutriator. A small amount of air or steam is used to fluidize this bed and carry the flyash overhead. After partial cooling of the elutriator gas, the particulates can be removed by a conventional electrostatic precipitator. The cleaned hot gases are then fed to the turbines for air compression and power generation.

The present invention also has application to the continuous chromatographic separation of a multicomponent feedstock as is described in U.S. Pat. No. 4,443,231 filed on the same date herewith. In conventional chromatographic processes, a multicomponent feed and a continuously flowing carrier fluid are introduced into a column packed with an adsorbent. The adsorbent is usually a porous or granular solid while the feed may be in either the liquid or gaseous state. The components of the feed are stratified in the column by selective adsorption and desorption, and exit from the column with the carrier fluid at different times, the components being least adsorbed in the column exiting first.

Normally, conventional chromatographic processes are batch operations since the devices and techniques employed to stimulate continuous operations (e.g. multiple feed and exit points, moving baffles, rotating packed columns etc.) are cumbersome and mechanically complicated. However since only the bed solids move, a transverse flow magnetically stabilized bed can separate a feed into two or more components continuously without the mechanical limitations and disadvantages of prior art processes. In addition, feed component separation will be enhanced by using smaller size adsorbents particles without increasing the pressure drop above the weight of the bed.

Figure 1:
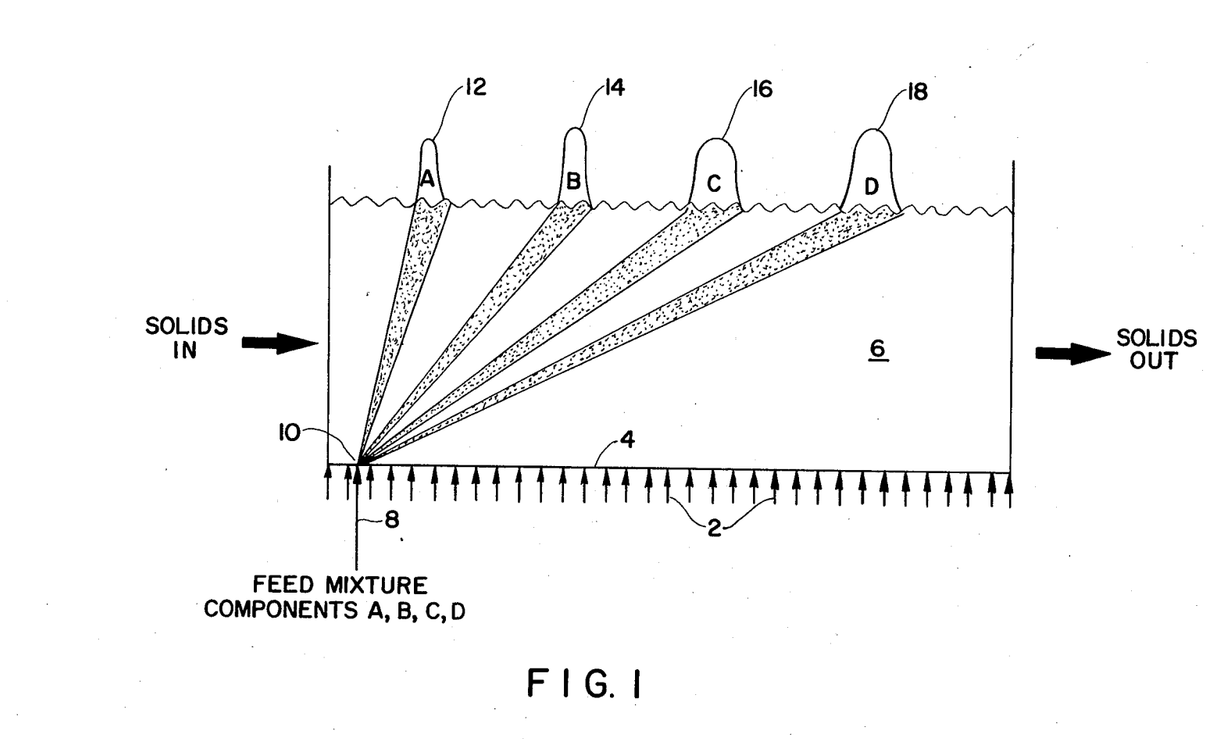
FIG. 1 illustrates the use of a transverse flow magnetically stabilized fluidized bed in continuous chromatographic separations.

FIG. 1 illustrates the use of the present invention to separate a feed mixture into its components. Mixtures that can be separated according to the present invention include mixtures of straight chain and branched chain hydrocarbons, at least one $C_8$ aromatic isomer from a mixture of hydrocarbons and the like. As shown therein, a vertically flowing carrier fluid 2 (i.e. fluidizing fluid) passes continuously through a distribution means 4 and fluidizes a magnetically stabilized bed 6 containing solid adsorbents that flow perpendicular (i.e. crossflow) to the carrier fluid. Although the solids flow need not be perpendicular to the flow of the carrier fluid, such is desired in this particular embodiment to obtain a more efficient separation. A feed mixture 8 having at least two components (four components A through D are shown in FIG. 1) is introduced into bed 6 at injection point 10 and contacts the adsorbent(s) therein for a period of time necessary to separate at least a portion of one of said components from said mixture. Each component of the mixture has different adsorption-desorption characteristics with respect to the bed solids. In this illustration, component A is least strongly adsorbed by the bed solids while components B, C and D are more strongly adsorbed. Each component moves through the bed due to the upward flow of the carrier fluid and the transverse flow of bed solids. Thus, each component has a velocity vector in two directions—one is in the direction of solids movement due to adsorption thereon while the other is in the direction of the carrier fluid toward the upper surface of the bed due to desorption of the components from the solids. The point at which a particular component exits from the upper surface of the bed depends upon several factors including the transverse flow velocity of the bed solids, the velocity of the carrier fluid and the adsorption-desorption characteristics of the bed solids. For example the weakest adsorbed component (component A) is not transported significantly by the moving solids and exits from the upper surface of the bed close to the feed injection point at location 12. The more strongly adsorbed components (components B, C and D) pass further downstream with the adsorbent solid and, consequently, exit from the upper surface of the bed further from the feed injection point at locations 14, 16 and 18. Components A through D can then be recovered from the upper surface of the bed at different distances downstream from the injection point along the path or flow direction of said bed. In a broad embodiment, at least one product stream will be recovered from said transverse flowing bed along the path of said bed, said product stream comprising a portion of the carrier fluid and a portion of the feed mixture containing at least a portion of one of said components.

The present invention can also be applied to separate a mixture comprising non-magnetic solids having different densities by adjusting the specific gravity of the bed as is disclosed in copending application Ser. No. 345,049 filed on the same date herewith. As disclosed therein, a mixture comprising non-magnetic solids having different densities is introduced into a transverse flow magnetically stabilized bed. Solids which are more dense than the bed medium ideally tend to sink in the bed while solids which are lighter than the bed medium tend to float on the surface of the bed. Since two or more different density fractions may be recovered according to this process, the bed should be stabilized to eliminate solids remixing. Preferably the process should be operated at increased bed fluidity to facilitate movement of the solids and promote rapid separation.

FLOWABILITY OF MAGNETIZED SOLIDS

The ability to remove magnetized solids from a highly magnetized bed is important in many applications. With certain types of magnetizable solids, such as iron and steel, the particle-to-particle attraction leads to stickiness in the bed that limits the bed fluidity in continuous units at particle magnetization values (M) of greater than about 500 Gauss. In otherwords, the fluidity of some magnetizable particle particulate beds decreases with increasing applied magnetic field to the point where the bed solidifies as a slug. Low fluidity can cause flow stoppage and bed "locking" which can adversely effect the smooth operation of magnetically stabilized beds. Hence, bed fluidity is an important parameter for the design of a magnetically stabilized bed adsorber or reactor system.

In the following discussion, bed fluidity is characterized as a function of applied magnetic field and operating conditions. It thus establishes the basis for operating a transverse flowing bed at or near the transition point between the stable and bubbling regime a stable bed and a bubbling bed.

The experiments conducted show that the angle of repose of the bed particles relative to that of a loosely packed bed can be used as a measure of bed fluidity. The angle of repose, $\beta$, is the angle the surface of a pile of solids makes with the horizontal. Depending on the method of determination, various angles of repose can be defined. For example, the poured angle of repose is the maximum angle of the slope of a pile of solids poured from a funnel. In contrast, the tilting angle of repose is the maximum angle of tilt of a bed of solids before sloughing occurs.

A characteristic feature of fluidized beds of cohesionless solids (solids without interparticle forces) is that the angle of repose, $\beta$, decreases gradually with increasing superficial velocity, U, from its initial value, $\beta_o$ at U=0, to zero at the minimum fluidization velocity $U_{mf}$. Thus, $$\tan \beta = \left(1 - \frac{U}{U_{mf}}\right) \tan \beta_o \tag{1}$$

The initial angle of repose, $\beta_o$, is approximately equal to the angle of internal friction, $\phi$, of a loosely packed bed. Thus, Equation (1) becomes $$\tan \beta = \left(1 - \frac{U}{U_{mf}}\right) \tan \phi \tag{2}$$

The tangent of $\phi$ is referred to as the coefficient of interparticle friction.

The decrease in the angle of repose with increasing velocity is due to the corresponding decrease in interparticle friction. When interparticle friction becomes very small or vanishes, the solids exhibit full liquid-like behavior having very small or no resistance to shear such that the angle of repose becomes zero.

The decrease of interparticle friction with increasing velocity is also reflected in the viscosity of incipiently fluidized beds. In these beds, the flow limit, i.e., the shear stress, $\tau_o$, below which the bed behaves as a rigid structure, decreases with increasing superficial velocity and approaches zero at the minimum fluidization velocity. Below minimum fluidization, the bed is in a semifluid state and resembles a Bingham plastic with an angle of repose and a flow limit greater than zero.

When interparticle cohesive forces are present, as in the case of magnetically stabilized beds, Equations (1) and (2) are not applicable. These cohesive forces, imparted by the magnetic field, alter the rheological characteristics of the magnetized solid particles and therefore affect the angle of repose.

EXPERIMENTAL DETERMINATION OF SOLIDS ANGLE OF REPOSE IN A MAGNETICALLY STABILIZED BED

The poured angle of repose was determined by partially filling a 7.62 cm diameter fluidized bed vessel with magnetizable solids. A solenoid electromagnetic was placed around the bed of solids so as to provide a substantially uniform magnetic field. The bed was fluidized by passing air through a distributor grid at the lower portion of the vessel. Additional magnetizable solids were poured into the container from a funnel that was raised as the pile of solids increased to cover the 7.62 cm diameter surface. The results of several tests are shown in Tables II and III.

The tilting angle of repose was determined in a manner similar to that described above. The vessel was partially filled with magnetizable solids, a magnetic field was applied and the bed was fluidized by passing air through the grid. Then the bed surface was tilted very slowly about the horizontal axis to a maximum angle without the solids sliding while the bed surface remained perpendicular to the direction of flow and the walls of the vessel. When the bed surface was tilted beyond the maximum angle, sliding occurred. The angle of the bed surface to the horizontal once the solids begin sliding is defined as the angle of repose. Data for the tilting angle of repose are shown in Table IV.

As shown therein at zero applied field, the angle of repose decreases with increasing velocity and approaches zero at the minimum fluidization velocity. This is in agreement with Equations (1) and (2). When the applied field is greater than zero, the angle of repose similarly decreases with increasing velocity but approaches zero at velocities much greater than the minimum fluidization velocity. The data indicate that the angle of repose becomes zero at approximately the transition velocity. This suggests that a magnetically stabilized bed is not fully fluid until velocities above the transition velocity are attained, despite the pressure drop being approximately equal to bed weight above minimum fluidization. Below transition, the bed is in a semifluid state.

TABLE II

POURED ANGLE OF REPOSE

Material: 33 Wt. % RO Stainless Steel Beads
Particle Size: 192 μm
Particle Density: 2 g/cm³
Bed Height: 3.3~5.1 cm     Bed Diameter: 7.62 cm

| Applied Field, Ostereds | Magnetization, Gauss | Velocity, cm/sec | Angle of Repose β, Degrees | Tan β | Remarks |
|---|---|---|---|---|---|
| 0 | 0 | 0 | 31 | 0.60 | $U_{mf} = 5$ cm/sec |
| 0 | 0 | 5 | 3 | 0.06 | |
| 130 | 57 | 0 | 34 | 0.66 | $U_T = 12.8$ cm/sec |
| 130 | 57 | 0 | 37.5 | 0.76 | |
| 130 | 57 | 4.4 | 22 | 0.40 | |
| 130 | 57 | 7.8 | 7.5 | 0.13 | |
| 130 | 57 | 7.8 | 6 | 0.10 | |
| 200 | 82 | 0 | 45 | 1.00 | $U_T = 17.2$ cm/sec |
| 200 | 82 | 0 | 43 | 0.93 | |
| 200 | 82 | 4.3 | 34 | 0.66 | |
| 200 | 82 | 4.3 | 31 | 0.60 | |
| 200 | 82 | 7.8 | 18.5 | 0.33 | |
| 200 | 82 | 7.8 | — | — | |
| 200 | 82 | 10 | 15 | 0.26 | |
| 300 | 124 | 0 | 49 | 1.13 | $U_T = 26.0$ cm/sec |
| 300 | 124 | 7.8 | 36 | 0.73 | |
| 300 | 124 | 14.2 | 25 | 0.46 | |
| 300 | 124 | 19.3 | 15 | 0.26 | |

TABLE III

POURED ANGLE OF REPOSE

Material: Magnetite
Particle Size: 266 μm
Particle Density: 5 g/cm³
Bed Height: 2.5~5.1 cm     Bed Diameter: 7.62 cm

| Applied Field, Ostereds | Magnetization, Gauss | Velocity, cm/sec | Angle of Repose β, Degrees | Tan β | Remarks |
|---|---|---|---|---|---|
| 0 | 0 | 0 | 39 | 0.80 | $U_{mf} = 13.7$ cm/sec |
| 0 | 0 | 7.5 | 21 | 0.38 | |
| 0 | 0 | 12.3 | 9 | 0.15 | |
| 0 | 0 | 12.3 | 11.5 | 0.20 | |
| 65 | 210 | 0 | 41 | 0.86 | $U_T = 43.2$ cm/sec |
| 65 | 210 | 12.8 | 34 | 0.66 | |
| 65 | 210 | 22.6 | 25 | 0.46 | |
| 65 | 210 | 38.6 | 8 | 0.13 | |
| 65 | 210 | 38.6 | 5 | 0.08 | |
| 130 | 380 | 0 | 45 | 1.0 | $U_T = 65.8$ cm/sec |
| 130 | 380 | 0 | 47 | 1.06 | |
| 130 | 380 | 8.6 | 45 | 1 | |
| 130 | 380 | 19.3 | 41 | 0.86 | |
| 130 | 380 | 25.7 | 34 | 0.66 | |
| 130 | 380 | 45 | 15 | 0.26 | |
| 200 | 560 | 0 | 55 | 1.40 | |
| 200 | 560 | 0 | 51 | 1.26 | |

TABLE IV

TILTING BED ANGLE OF REPOSE

Material: 33 Wt. % RO Stainless Steel Beads
Particle Size, Nominal: 177–425 μm
Particle Density: 1.7 g/cm³
Bed Height: 3.8 cm     Bed Diameter: 3.8 cm

| Applied Field, Oersteds | Velocity, cm/sec | Angle of Repose β, Degrees | Tan β |
|---|---|---|---|
| 0 | 0 | 34 | 0.67 |
| 0 | 4 | 4.5 | 0.07 |
| 0 | 4 | 5 | 0.087 |
| 150 | 4 | 20 | 0.36 |
| 150 | 5 | 19 | 0.34 |
| 150 | 6 | 10 | 0.17 |
| 150 | 8.5 | 4.5 | 0.078 |
| 300 | 4 | 30 | 0.58 |
| 300 | 6 | 28 | 0.53 |
| 300 | 8.5 | 24 | 0.44 |
| 300 | 10.8 | 19 | 0.34 |
| 300 | 13.5 | 14 | 0.25 |
| 300 | 19.0 | 5.5 | 0.096 |
| 480 | 4.5 | 42.5 | 0.91 |
| 480 | 8.5 | 43 | 0.93 |
| 480 | 13.5 | 37 | 0.75 |
| 480 | 19.0 | 21 | 0.38 |
| 480 | 23.0 | (1) | (1) |

(1) Channeling at the wall

The angle of repose increased with increasing magnetic field. At high fields and low-to-moderate velocities, the bed attained values that are higher than the angle of repose of loosely packed solids. This would imply that at high particle magnetizations, the fluidity in a magnetically stabilized bed is lower than that of packed beds. In the case of the magnetite used for the experiments reported in Table III, at high applied fields, the bed was highly structured and needle formation was observed at the surface of the pile. The length of the needles increased with magnetization and sometimes reached the tip of the funnel.

THE EFFECT OF INTERPARTICLE COHESIVE FORCES ON BED FLUIDITY

The presence of interparticle magnetic forces in a magnetically stabilized bed gives rise to a bed structure with mechanical strength even in an expanded state.

The particles are not "free flowing" as in a conventional fluidized bed because each collision leads to coherence between the colliding particles. The bed resembles a Bingham plastic with a yield stress greater than zero. Increasing the magnetic forces increases the resistance to deformation and flow. Furthermore, the flow properties will be anisotropic due to dipole-dipole orientation of bed particles along the direction of applied field. An analysis of the data in Tables II, III and IV indicates that the effect of these forces on bed fluidity is reflected in the angle of repose. Thus, the angle of repose of the magnetized solids in a fluidized bed can be used as a measure of the relative fluidity of the solids in magnetically stabilized beds.

A flow resistance index, R, is defined as follows $$R = \frac{\tan \beta}{\tan \phi} \cong \frac{\tan \beta}{\tan \beta_o} \quad (3)$$

where $\beta$ is the poured angle of repose measured at a given velocity and particle magnetization, $\beta_o$ is the poured angle of repose of loosely packed solids at $U=0$ and $M_p=0$, and $\phi$ is the angle of internal friction, taken equal to $\beta_o$. When $R=0$ the bed is fully fluidized and the fluidity is similar to that of an incipiently fluidized bed without a magnetic field. When $R=1$, bed fluidity should be essentially the same as the fluidity of a packed bed of solids. For $0<R<1$, the bed is in a semi-fluid state with a fluidity between that of a packed bed and a fluidized bed. For $R>1$, bed fluidity would be less than that of a packed bed.

Using the data in Tables II, III and IV for a bed of 192 micron, 38 wt. % stainless steel beads at $H_A=300$ Oersteds ($M_p=125$ Gauss), the flow resistance index had the following values as a function of superficial velocity:

| U(cm/sec) | | R |
|---|---|---|
| | 0 | 1.85 |
| $U_{mf}=$ | 5 | 1.78 |
| $0.5\ U_T=$ | 13 | 0.83 |
| $0.8\ U_T=$ | 21 | 0.37 |
| $U_T=$ | 26 | 0.00 | where $U_T=$transition velocity. Thus for this example, at superficial fluid velocities of 50% of $U_T$ and greater, the flow resistance index is less than 1 and the bed has greater fluidity than a loosely packed fixed bed.

The experimental results shown in Tables II, III and IV indicate that, due to interparticle magnetic forces, the fluidity of magnetically stabilized bed decreases with increasing particle magnetization, and decreasing bed expansion and superficial velocity. The angle of repose and the flow resistance index are good indications of fluidity in a magnetically stabilized bed relative to that of packed and fully fluidized beds of the same solids.

This invention will be further understood by reference to the following examples which are not intended to restrict the limits of the claims appended hereto.

Several experiments were conducted in a transverse flow magnetically stabilized bed to illustrate the regions of increased fluidity as the transition from stabilized to bubbling bed is approached. Increased fluidity may be obtained by either increasing the superficial velocity of the fluidizing medium or decreasing the strength of the magnetic field (or using particles having reduced permanent magnetization).

Figure 2:
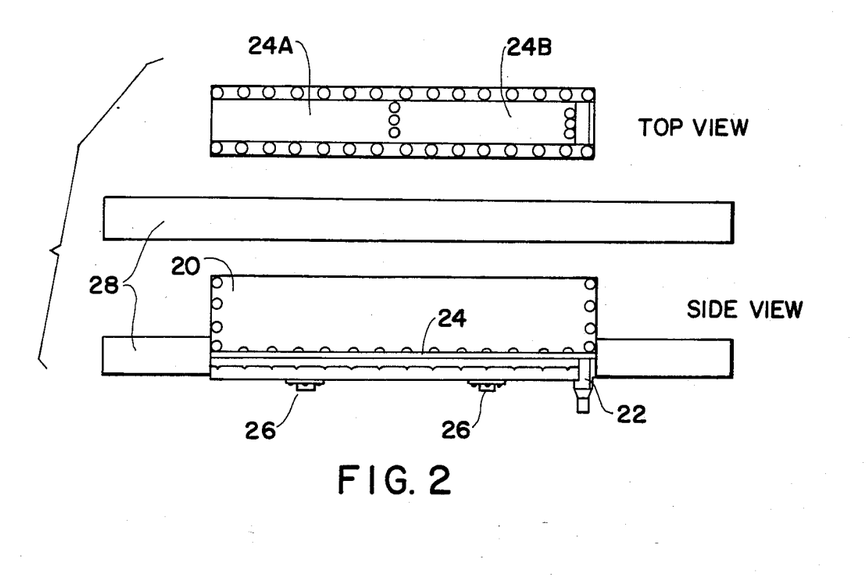
FIG. 2 illustrates a simplified diagram of the top and side view of the transverse flow magnetically stabilized fluidized bed experimental apparatus.

FIG. 2 shows a schematic diagram of the top and side view of the transverse flow magnetically stabilized bed experimental apparatus. Solids are added from the left side above the bed 20, flow to the right, and exit through a one inch space 22 at the end of the grid 24. The length of the bed in the solids flow direction is about 27 inches and bed widths of one and three inches are used. Grid 24 is divided into two sections 24A and 24B, each about 13.5 inches long, which are supplied with fluidizing air 26 independently.

Continuous operation is achieved using pneumatic transport of the solids from below to above the bed. Solids flow from the bed into a one inch transfer tube on the right side and are then carried up a one inch riser tube to a three inch disengaging section.

The magnetic field is produced by two solenoidal electromagnets 28, connected in parallel, placed one above the other 15.5 cm apart. The magnets are made of 700 turns of #14 enamelled copper wire and are elliptical in design with inside dimensions of 22 cm×94.5 cm. Due to the smaller radius of curvature, the magnetic field is naturally higher at the ends of the magnets.

In performing the experiments, the solids were first added and fluidized vigorously. Solids circulation was then initiated and the velocity of the fluidizing gas was established. The magnetic field was then applied.

Figure 3:
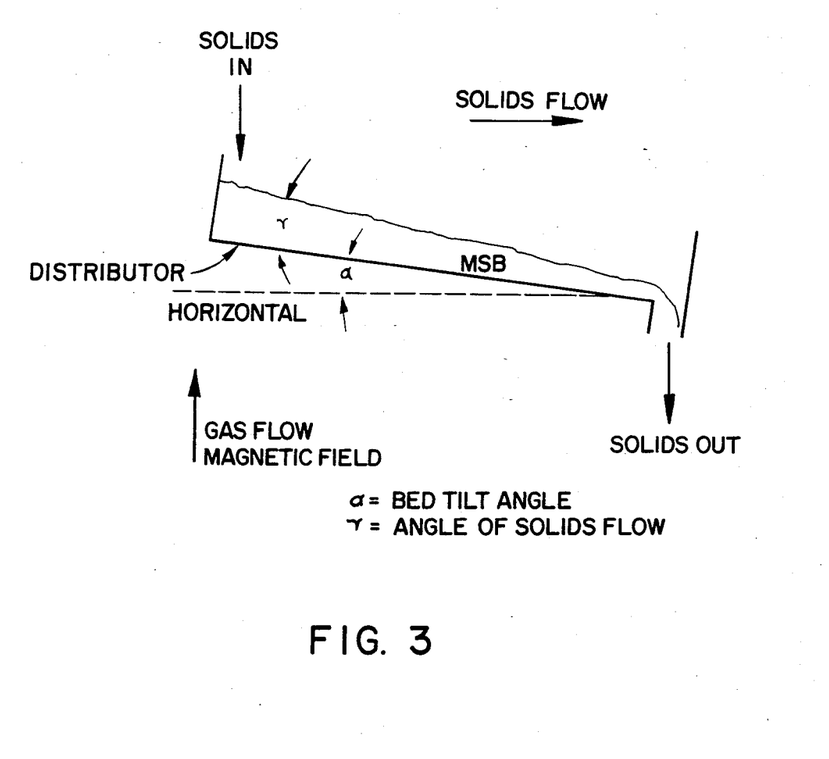
FIG. 3 illustrates the flow of solids and the angles associated therewith in a transverse flow magnetically stabilized fluidized bed.

The effects of magnetic field and superficial gas velocity on bed solids transverse flow velocity and angle of solids flow were determined by setting the gas velocity with solids circulation and then increasing the applied magnetic field for several values of fluidizing velocity. Data were obtained at increasing magnetic field strengths ranging from just above stabilization to either the point at which the flow of solids stopped or to about 150 Oersted, the maximum obtainable magnetic field with the experimental apparatus. Thus, data were taken at fluidity ratios just above zero to higher values as the magnetic field was increased. The solids transverse flow velocity was determined by measuring the time necessary for the solids to move between two points. The points were approximately 23 cm apart and located toward the center of the bed to eliminate end effects. The angle of solids flow was determined by measuring the height of the bed at the same two points. FIG. 3 defines the distributor or bed tilt angle ($\alpha$) and the angle of solids flow ($v$).

The particular bed tilt angle employed is not critical and may vary broadly, depending upon the specific application of the present invention. Normally, however, the bed tilt angle will be less than 45 degrees and preferably less than 30 degrees with respect to the horizontal (i.e. the bed is inclined in a direction opposite to the solids flow along the distribution means or grid). Thus as shown in FIG. 3, the bed surface is at a higher elevation where the solids are introduced than where said solids are removed from the bed. For chromatographic separations, the bed tilt angle is most preferably less than 20 degrees.

Figure 4:
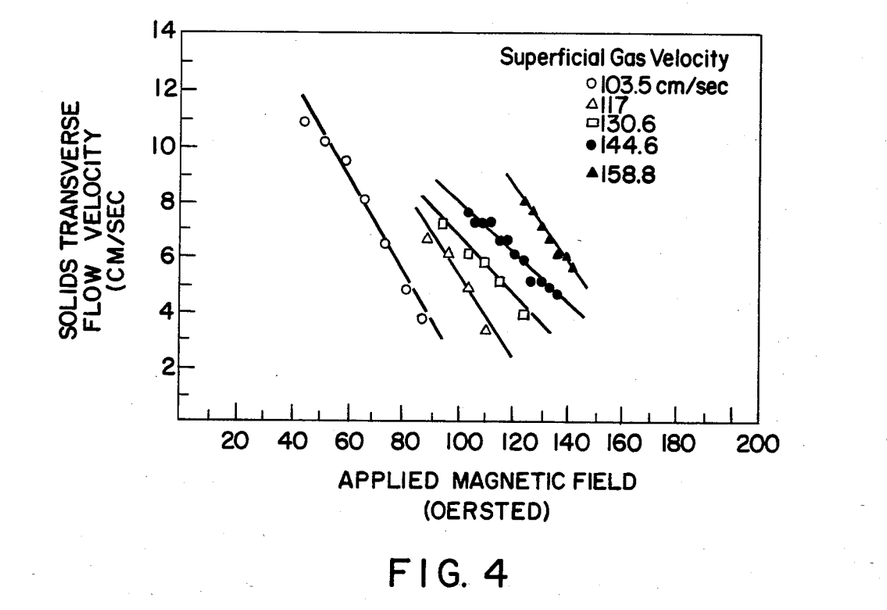
FIG. 4 illustrates the effect of applied magnetic field and superficial gas velocity on solids transverse flow velocity in transverse flow magnetically stabilized fluidized beds.
Figure 5:
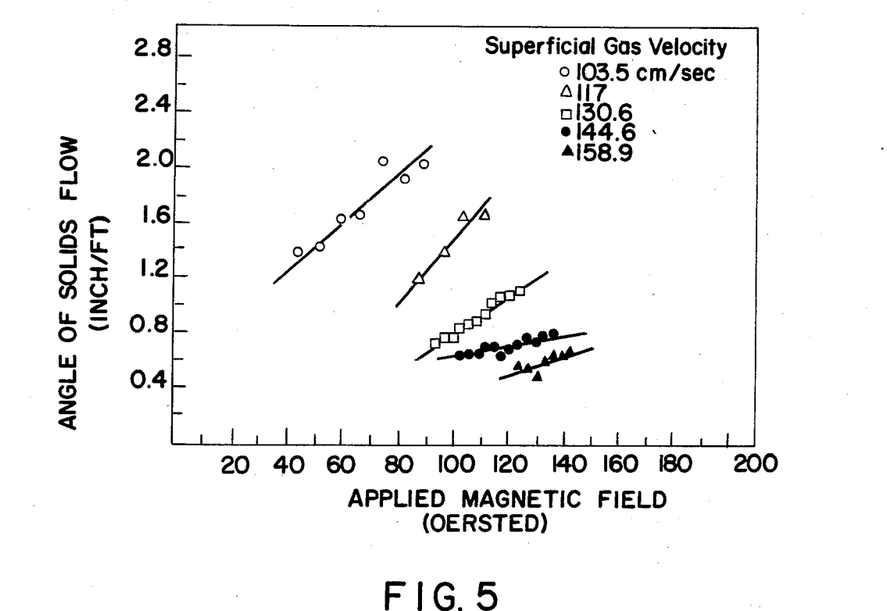
FIG. 5 illustrates the effect of applied magnetic field and superficial gas velocity on the angle of solids flow in transverse flow magnetically stabilized fluidized beds.
Figure 6:
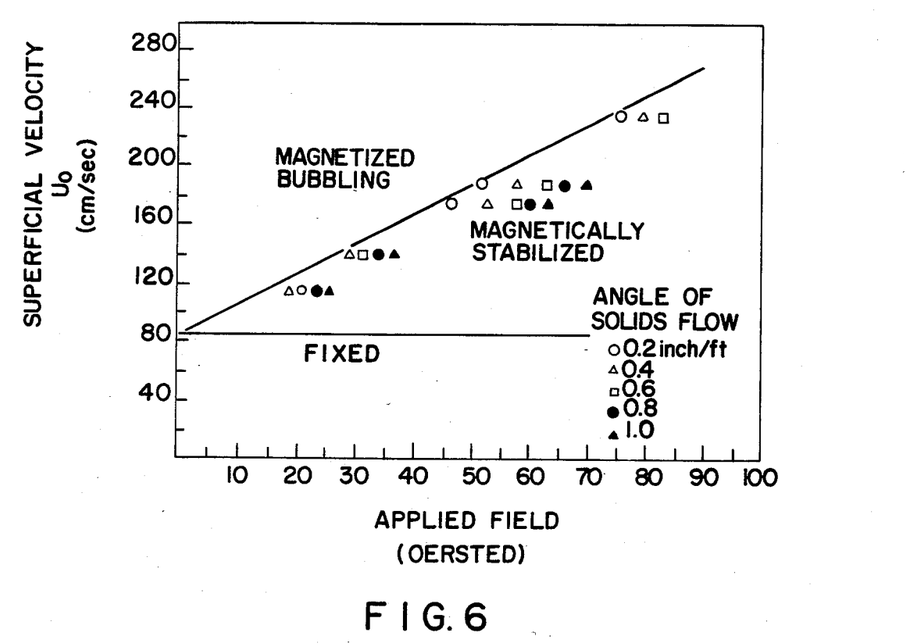
FIG. 6 illustrates increased solids fluidity in transverse flow magnetically stabilized beds near the transition locus.

FIGS. 4 and 5 show the effects of magnetic field and superficial gas velocity on solids transverse flow velocity and angle of solids flow for composite particles of 70 wt. % stainless steel-alumina having $-12+20$ U.S. sieve size. In FIG. 4, the solids transverse flow velocity (i.e. bed fluidity) is decreased by increasing the applied magnetic field or decreasing the superficial gas velocity. In FIG. 5, the angle of solids flow relative to the horizontal increases as the applied magnetic field is increased and decreases as the superficial gas velocity is increased. FIG. 6 is a crossplot of data similar to that shown in FIG. 5 for steel spheres, −20+30 U.S. sieve size, and shows that increased bed fluidity for transverse flow in magnetically stabilized beds is obtained when operating closer to the locus of transition at lower fluidity ratios.

Another series of experiments were conducted using a transverse flow magnetically stabilized bed to determine (1) the effects of solids transverse flow on the transition velocity; (2) the solids flow pattern; and (3) the flow resistance index, R. The unit employed was 10.16 cm wide, 55.88 cm long, had a porous plate grid and was similar in construction to that shown in FIG. 2. A solids inlet baffle provided an opening of 5.5 cm above the porous plate grid through which solids flowed from a hopper. At the other end of the bed the solids flowed over a 7.6 cm high weir. The unit was surrounded by four electromagnets each 0.91 m inside diameter, 1.52 m outside diameter, and 15.9 cm high. There was a 17.8 cm spacing between each magnet.

The solids used were composite beads having a density of about 1 g/cc which comprised 40 wt. % magnetic stainless steel and 60 wt. % alumina. Two sizes of solids were tested: 180–840μ ($\bar{d}_p$=450μ) and 710–1680μ ($\bar{d}_p$=1050μ), where $\bar{d}_p$ is the mean volume surface particle diameter. The solids were transported from the bed outlet by a dilute phase riser to the solids feed hopper.

Figure 7:
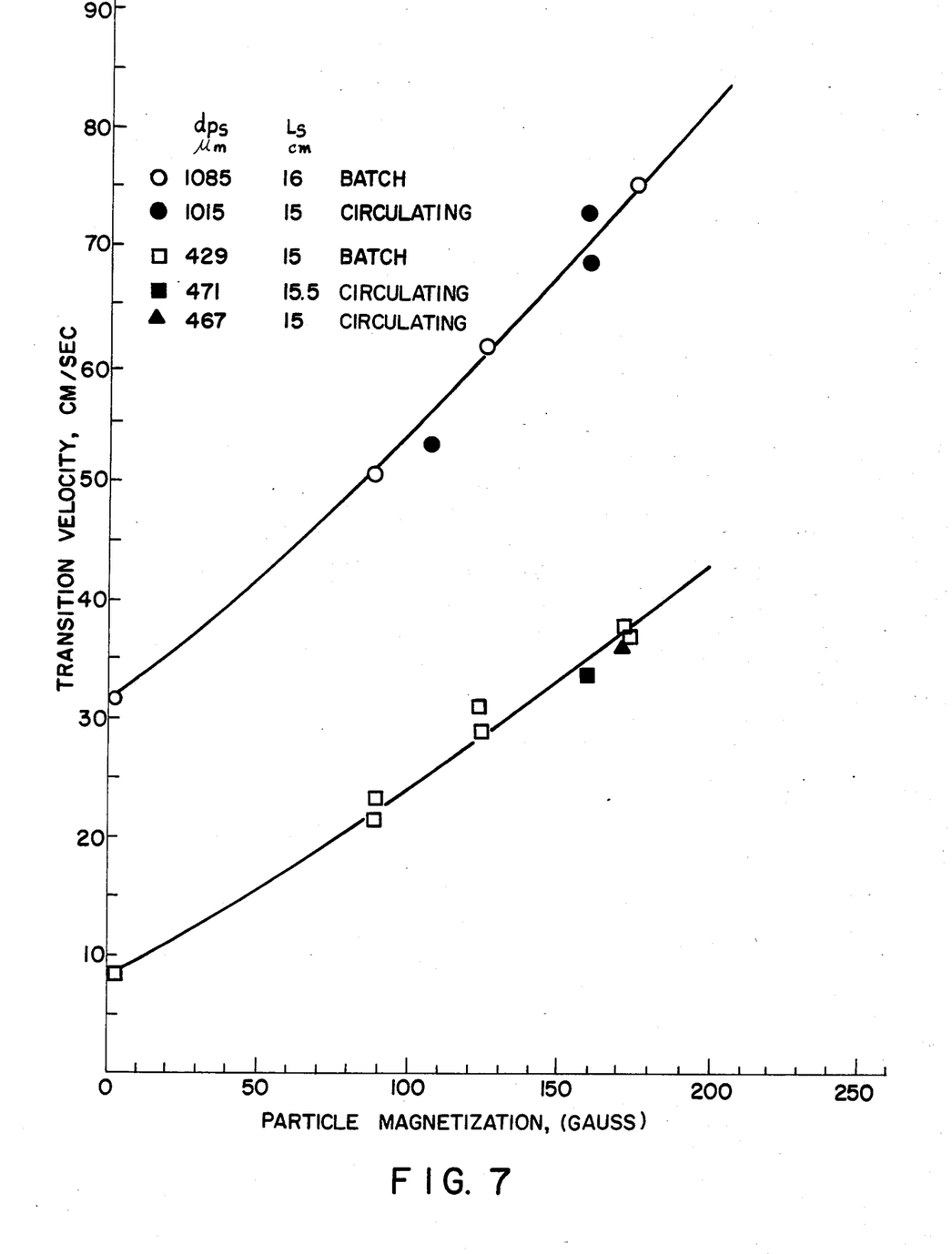
FIG. 7 illustrates the effect of solids circulation on transition superficial velocity in transverse flow magnetically stabilized fluidized beds.

A comparison of transition velocities in batch and circulating transverse flow beds for both sizes of particles appears in FIG. 7. $L_s$ is the initial settled bed depth. As shown therein, the transition velocity to bubbling was not affected by the continuous solids horizontal flow and was the same as that for batch beds of the same solids.

In most of the experimental runs the bed appeared to move in nearly plug flow. Over ninety percent of the bed exhibited plug flow while less than ten percent at the bottom showed some drag. Data showing the approach to plug flow are shown in Table V. Using the same solids, additional transverse bed flowability data were obtained and are tabulated in Table VI using the flow resistance index as a measure of fluidity.

TABLE V

| | | APPROACH TO PLUG FLOW | | | |
|---|---|---|---|---|---|
| Particle Size d, μm | Superficial Velocity $U_g$, cm/sec | Solids Linear Velocity, Exper.[1] $U_S$, cm/sec | Circulation Rate, Exper. $F_{exp}$, g/sec | Circulation Rate for Plug Flow[2] $F_{plug}$, g/sec | $F_{exp}/F_{plug}$ |
| 1015 | 67 | 1.8 | 132 | 143 | 0.92 |
| 830 | 55 | 1.7 | 135 | 145 | 0.93 |
| 471 | 33 | 2.3 | 158 | 177 | 0.90 |
| 467 | 34.5 | 2.5 | 165 | 184 | 0.90 |

[1] Measured at the bed surface by following tracer particles.
[2] Assumes that solids linear velocity is uniform and equal to the linear velocity of the tracer particles.

The data in Table VI clearly show that at a constant magnetic field, decreasing the superficial fluid velocity causes an increase in the flow resistance index and thus a decrease in fluidity. Therefore, the most fluid operating conditions are those nearer the transition locus (i.e., at high fluid velocities and low magnetic fields).

TABLE VI

| | | EFFECT OF SUPERFICIAL VELOCITY ON BED FLOWABILITY[1] | | | | |
|---|---|---|---|---|---|---|
| Superf. Velocity, cm/sec | Circulation Rate, Exp. $F_{exp}$, g/sec | Solids Linear Velocity $U_S$, cm/sec | Bed Height[3] H, cm | Angle of Repose β, Degrees | Flow Resistance Index[2] tan β/tan $β_o$ | Remarks |
| 34.5 | 165 | 2.5 | 15 | 14 | 0.42 | Smooth Plug Flow |
| 30.7 | — | 2.4 | 15.5 | 19.5 | 0.60 | Smooth Plug Flow |
| 26.0 | 176 | 2.4 | 16.5 | 25 | 0.79 | Smooth Plug Flow |
| 21.0 | 186 | 2.2 | 17.5 | 31 | 1.02 | Stick-Slip Flow |
| 18.5 | — | — | 18.5 | 33 | 1.10 | Stick-Slip Non-uniform Flow |

Figure 8:
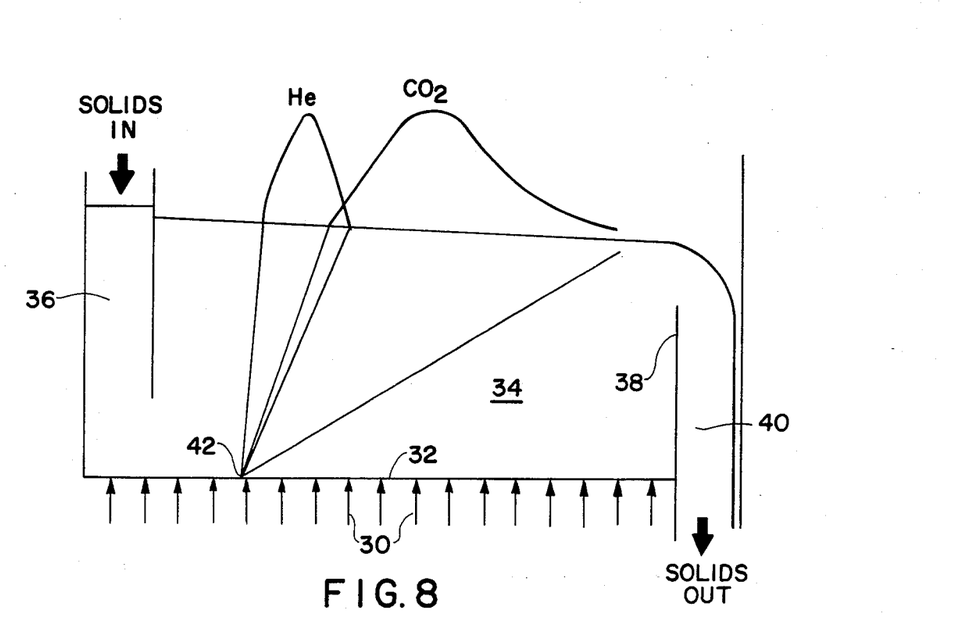
FIG. 8 illustrates a continuous chromatographic separation using a transverse flow magnetically stabilized fluidized bed.

[1] Small NALCO beads, $\bar{d}_p$ = 467 μm, $U_{mf}$ = 8.2 cm/sec, $M_p$ = 160 Gauss
[2] $β_o$: angle of repose of loosely packed solids in the absence of magnetic field = 30.5
[3] Average Height FIG. 8 illustrates the operation of a continuous chromatographic separator using a transverse flow magnetically stabilized bed. As shown therein, fluidizing air 30 is injected continuously through a porous bronze distributor grid 32 as solids move continuously perpendicular (or crossflow) to the gas flow. The solids are added to the bed 34 through a channel 36 on the left side, pass in plug flow to the right, over a weir 38, and exit the bed through a 1 inch long space 40 at the end of the grid. The length of the bed in the solids flow direction is approximately 27 inches and the bed width is 3 inches. The grid is divided into two sections, each about 13.5 inches long, which are supplied independently with fluidizing air. The solids are −20+60 U.S. sieve 70 wt. % stainless steel/alumina composite.

The magnetic field is produced by two solenoidal electromagnets connected in parallel, placed one above the other 15.5 cm apart, surrounding the crossflow bed. The magnets are elliptical in design with inside dimensions of approximately 30 cm × 105 cm. Each is made of 508 turns of #8 enameled copper wire.

Runs were made using a superficial fluidizing air velocity of 30.3 cm/sec, a bed solids crossflow velocity of 0.56 cm/sec, a bed height of 14 cm, and an applied magnetic field of 191.7 oersted. Trace quantities of He and $CO_2$ were introduced at injection point 42 through a ⅛ inch O.D., 1/16 inch I.D. copper tube. The fluidity ratio for this experiment was 0.32.

The concentration of each component was measured by passing the sample tube of a Matheson "leakmeter" (which measures thermal conductivity) along the top surface of bed 34 parallel to the solids flow. Runs were made for each component individually and for the simultaneous injection of both components. Helium caused a negative deflection of the concentration meter while $CO_2$ caused a positive deflection. The $CO_2$ was adsorbed more strongly by the alumina and passed vertically through the bed more slowly than He and thus exited from the top surface of bed 34 further downstream from the injection point than where He exited. The results from a run in which both He and $CO_2$ were simultaneously and continuously injected into a cross-flow MSB are shown in FIG. 8.

What is claimed is:

1. In a process for effecting fluid-solids contacting under fluidized conditions wherein a bed of fluidized magnetizable particles is contacted in at least a first contacting vessel with a fluidizing fluid stream which passes through said bed in an ascending manner and said particles are added and removed from a contacting zone, said bed being stabilized by a magnetic means having a strength sufficient to suppress substantial solids backmixing, the improvement which comprises continuously passing said bed of suspended magnetizable particles substantially transverse to the flow of the fluid stream and passing the fluid stream through said bed at an operating velocity such that the ratio of the difference between the transition velocity and the operating velocity to the difference between the transition velocity and the normal minimum fluidization velocity ranges between $-0.1$ and $+0.5$ so as to achieve enhanced solids fluidity.

2. The process of claim 1 wherein said magnetizable particles are removed from the first contacting vessel and passed to a second contacting vessel in which said particles flow transverse to a fluid stream in the presence of a magnetic stabilizing means, and said particles are then recirculated from said second contacting vessel to the first contacting vessel.

3. The process of claim 2 wherein the fluid stream in the first contacting vessel is different than the fluid stream in the second contacting vessel.

4. The process of claim 1 wherein said magnetizable particles are composites of non-ferromagnetic material, ferromagnetic material, ferrimagnetic material or mixtures thereof.

5. The process of claim 1 wherein said magnetizable particles are admixed with non-ferromagnetic material.

6. The process of claim 4 or 5 wherein the non-ferromagnetic material, the ferromagnetic material, the ferrimagnetic material or mixtures thereof has catalytic properties.

7. The process of claim 4 or 5 wherein the non-ferromagnetic material, the ferromagnetic material, the ferrimagnetic material or mixtures thereof has sorption properties.

8. The process of claim 1, 2, 4 or 5 wherein a hydrocarbon is converted in at least one contacting vessel.

9. The process of claim 1, 2, 4 or 5 wherein the sorption of at least one compound in said fluidizing fluid is carried out in at least one contacting vessel.

10. The process of claim 1 wherein particulate solids entrained in the fluidizing fluid are removed.

11. The process of claim 1 wherein a feed mixture containing at least two components is separated and at least one of said components is recovered.

12. The process of claim 11 wherein a mixture of hydrocarbons is separated in at least one contacting vessel.

13. The process of claim 12 wherein at least one $C_8$ aromatic isomer is separated from a mixture of hydrocarbons in at least one contacting vessel.

14. The process of claim 12 wherein straight chain hydrocarbons are separated from branched chain hydrocarbons in at least one contacting vessel.

15. The process of claim 1, 2, 4, or 5 wherein the magnetic means is an externally applied magnetic field.

16. The process of claim 1, 4 or 5 wherein said magnetic means is a generally uniform magnetic field applied externally in a direction generally colinear with the flow of the fluidizing fluid stream.

17. The process of claim 1, 2, 4 or 5 wherein said magnetic means is obtained using permanently magnetized particles.

18. The process of claim 1, 2, 4 or 5 wherein the fluidizing fluid stream is liquid.

19. The process of claim 1, 2, 4 or 5 wherein the fluidizing fluid stream is gaseous.

20. The process of claim 1, 2, 4 or 5 wherein said ratio lies in the range between $-0.05$ and $+0.2$.

21. The process of claim 1, 2, 4 or 5 wherein said ratio lies in the range between $-0.01$ and $+0.1$.

* * * * *

UNITED STATES PATENT OFFICE
CERTIFICATE OF CORRECTION

Patent No. 4,543,733          Dated 10/1/85

Inventor(s) Siegell et al

It is certified that error appears in the above-identified patent and that said Letters Patent are hereby corrected as shown below:

Column 3, line 46, "$\pm 0.5$" should read --+0.5--.

Signed and Sealed this

Twenty-eighth Day of January 1986

[SEAL]

Attest:

DONALD J. QUIGG

Attesting Officer      Commissioner of Patents and Trademarks